US010337571B2

(12) United States Patent
Cioc et al.

(10) Patent No.: US 10,337,571 B2
(45) Date of Patent: Jul. 2, 2019

(54) ELECTRONICALLY-CONTROLLED SELECTABLE CLUTCH WITH BACKLASH ARRANGEMENT (71) Applicant: Magna Powertrain, Inc., Concord (CA)

(72) Inventors: Adrian C. Cioc, Richmond Hills (CA); Darrell F. Greene, Bradford (CA); David V. Dorigo, Concord (CA); Sean A. Steele, Mississauga (CA); Myron R. Samila, Toronto (CA); Dennis T. Loui, Richmond Hill (CA)

(73) Assignee: MAGNA POWERTRAIN INC., Concord (CA)

( * ) Notice: Subject to any disclaimer, the term of this patent is extended or adjusted under 35 U.S.C. 154(b) by 0 days.

(21) Appl. No.: 15/562,538

(22) PCT Filed: Apr. 25, 2016

(86) PCT No.: PCT/IB2016/000630
§ 371 (c)(1),
(2) Date: Sep. 28, 2017

(87) PCT Pub. No.: WO2016/170429
PCT Pub. Date: Oct. 27, 2016

(65) Prior Publication Data
US 2018/0087586 A1 Mar. 29, 2018

Related U.S. Application Data (60) Provisional application No. 62/152,137, filed on Apr. 24, 2015, provisional application No. 62/270,212, filed on Dec. 21, 2015.

(51) Int. Cl.
*F16D 41/14* (2006.01)
*F16D 27/06* (2006.01)
(Continued)

(52) U.S. Cl.
CPC ............. *F16D 41/14* (2013.01); *F16D 27/06* (2013.01); *F16D 27/108* (2013.01);
(Continued)

(58) Field of Classification Search
CPC ........ F16D 41/084; F16D 41/12; F16D 41/14; F16D 41/16
See application file for complete search history.

(56) References Cited

U.S. PATENT DOCUMENTS 1,615,534 A * 1/1927 Cassel ..................... F16D 41/12
123/179.9
1,767,593 A * 6/1930 Laabs ...................... F16D 41/12
192/42
(Continued)

FOREIGN PATENT DOCUMENTS

| CN | 1748094 A | 3/2006 |
| CN | 101210594 A | 7/2008 |

(Continued)

OTHER PUBLICATIONS

International Search Report and Written Opinion dated Aug. 4, 2016 from International Patent Application Serial No. PCT/IB2016/000630.
(Continued)

*Primary Examiner* — Stacey A Fluhart
(74) *Attorney, Agent, or Firm* — Dickinson Wright PLLC (57) ABSTRACT

A bi-directional clutch assembly includes an outer race presenting a plurality of inner ratchet teeth and an inner race presenting a plurality of outer ratchet teeth. A passive one-way clutch includes a plurality of passive struts supported by the inner race and pivotable into engaging relationships with the inner ratchet teeth during rotation of the inner race in a first direction. A selectable one-way reverse clutch includes at least one active strut supported by the
(Continued)

outer race and selectively pivotable from an unlocked position to a locked position to engage one of the outer ratchet teeth during rotation of the inner race in the second direction. The passive struts are unevenly circumferentially spaced from one another along the inner race to establish an indexed relationship among the passive struts for staggering engagement of sequential passive struts with the inner ratchet teeth of the outer race.

17 Claims, 6 Drawing Sheets

(51) Int. Cl.
*F16D 27/108* (2006.01)
*F16D 27/118* (2006.01)
*F16D 41/16* (2006.01)
*F16D 27/10* (2006.01)
*F16D 41/04* (2006.01)
*F16D 27/00* (2006.01)

(52) U.S. Cl.
CPC ............ *F16D 27/118* (2013.01); *F16D 41/16* (2013.01); *F16D 27/10* (2013.01); *F16D 41/04* (2013.01); *F16D 2027/001* (2013.01)

(56) References Cited

U.S. PATENT DOCUMENTS

| | | | |
|---|---|---|---|
| 3,194,369 A | 7/1965 | White | |
| 6,189,666 B1 | 2/2001 | Willmot | |
| 8,491,439 B2* | 7/2013 | Kimes | F16D 41/084 |
| | | | 192/43.1 |
| 2002/0005327 A1* | 1/2002 | Muramatsu | F16D 41/12 |
| | | | 192/46 |
| 2003/0057047 A1* | 3/2003 | Jin | F16D 41/12 |
| | | | 192/46 |
| 2006/0021840 A1 | 2/2006 | Kimes et al. | |
| 2006/0238276 A1* | 10/2006 | Pance | H01P 7/10 |
| | | | 333/219.1 |
| 2013/0319812 A1 | 12/2013 | Wys et al. | |
| 2014/0102844 A1 | 4/2014 | Greene et al. | |
| 2016/0091035 A1* | 3/2016 | Dattawadkar | F16D 41/12 |
| | | | 192/46 |
| 2016/0160941 A1* | 6/2016 | Green | F16D 27/09 |
| | | | 192/71 |
| 2018/0172088 A1* | 6/2018 | Peglowski | F16D 41/04 |

FOREIGN PATENT DOCUMENTS

| | | |
|---|---|---|
| CN | 201461803 U | 5/2010 |
| CN | 101764463 A | 6/2010 |
| CN | 103591180 A | 2/2014 |
| CN | 103765028 A | 4/2014 |
| CN | 103807319 A | 5/2014 |
| WO | WO9842996 A1 | 10/1998 |
| WO | WO2009100094 A3 | 10/2009 |
| WO | WO2015030983 A1 | 3/2015 |
| WO | WO2015127546 A1 | 9/2015 |

OTHER PUBLICATIONS

Search Report dated Dec. 14, 2018 from corresponding Chinese Patent Application No. 201680031862.8.

Search Report dated Dec. 17, 2018 from corresponding Chinese Patent Application No. 201680035368.9.

Search Report dated Nov. 22, 2018 from corresponding Chinese Patent Application No. 201680031938.7.

* cited by examiner

ELECTRONICALLY-CONTROLLED SELECTABLE CLUTCH WITH BACKLASH ARRANGEMENT

CROSS-REFERENCE TO RELATED APPLICATIONS

This application claims the benefit of U.S. Provisional Application No. 62/152,137 filed Apr. 24, 2015 and U.S. Provisional Application No. 62/270,212 filed Dec. 21, 2015, the entire disclosures of which are incorporated herein by reference.

FIELD OF THE INVENTION

The present disclosure is generally related to overrunning coupling devices such as one-way clutches or brakes and, more specifically to selectable one-way coupling (SOWC) devices having an electromagnetic actuator assembly and bi-directional clutches having optimized backlash configuration.

BACKGROUND OF THE INVENTION

This section provides background information related to the present disclosure which is not necessarily prior art.

Automatic transmissions provide a plurality of forward and reverse speed or gear ratios by selectively actuating one or more clutches and/or brakes to establish a torque-transmitting drive connection between a transmission input and a transmission output for supplying motive power (i.e., drive torque) from a powertrain to a driveline in a motor vehicle. One type of brake or clutch widely used in automatic transmission is an overrunning coupling device, commonly referred to as a one-way clutch (OWC), which overruns when one of its races (in radial coupling configuration) or one of its drive plates (in axial coupling configurations) rotates in a first (i.e., freewheel) direction relative to the other race or drive plate, and engages or locks in a second (i.e., lockup) direction. Such conventional one-way clutches provide no independent control over their modes of operation, that is to say whether they lockup or freewheel in both directions and are commonly referred to as passive one-way clutches. Thus, basic one-way clutches provide a "locked" mode in one rotary direction and a "freewheel" mode in the opposite direction based on the direction that the drive torque is being applied to the input race or drive plate.

There are however, requirements in modern automatic transmissions where a "controllable" overrunning coupling device, commonly referred to as a selectable one-way clutch (SOWC), can be selectively controlled to provide additional functional modes of operation. Specifically, a selectable one-way clutch may further be capable of providing a freewheel mode in both rotary directions until a command signal (i.e., from the transmission controller) causes a power-operated actuator to shift the coupling device into its lockup mode. Thus, a selectable one-way clutch may be capable of providing a drive connection between an input member and an output member in one or both rotational directions and it may also be operable to freewheel in one or both directions. It is also known in modern automatic transmissions to integrate a passive one-way clutch and a selectable one-way clutch into a combined coupling device, commonly referred to as a bi-directional clutch.

A need exists to continue development of new and improved overrunning coupling devices that advance the art and provide enhanced functionality.

SUMMARY OF THE INVENTION

A bi-directional clutch assembly includes an outer race presenting a plurality of inner ratchet teeth and an inner race presenting a plurality of outer ratchet teeth. The bi-directional clutch assembly includes a passive one-way forward clutch which includes a plurality of passive struts pivotably supported by the inner race. The passive struts pivot into engaging relationships with the inner ratchet teeth during rotation of the inner race in a first direction. The bi-directional clutch assembly includes a selectable one-way reverse clutch which includes at least one active strut supported by the outer race and which is selectively pivotable from an unlocked position to a locked position. In the unlocked position, the active strut is disengaged from the outer ratchet teeth and the inner and outer races are free to rotate relative to one another in both the first direction as well as a second direction that is opposite the first direction. In the locked position, the at least one active strut engages one of the outer ratchet teeth during rotation of the inner race in the second direction.

The passive struts are unevenly circumferentially spaced from one another along the inner race to establish an indexed relationship among the passive struts. This unevenly circumferentially spaced relationship establishes a staggered engagement of the passive struts with the inner ratchet teeth of the outer race. Put another way, the passive struts are indexed to stagger their respective engagements with the inner ratchet teeth. Such an arrangement refines backlash of the passive one-way forward clutch and ultimately leads to improved control and optimization of the forward to reverse backlash of the bi-directional clutch assembly.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENTS

Example embodiments will now be described more fully with reference to the accompanying drawings. In general, each embodiment is directed to an overrunning coupling device (i.e. brake and/or clutch) having at least a controllable one-way locking device including a moveable locking component (i.e. sprag, strut, etc.) that is controlled via an electromagnetic actuator. Thus, the electromechanical rocker clutch transmits torque mechanically but is actuated via an electrical actuation system. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the several views, a bi-directional clutch assembly 20 is generally shown. As will be detailed, bi-directional clutch assembly 20 generally includes a stationary outer race, a rotatable inner race, a passive one-way clutch having a plurality of passive struts, and a selectable one-way clutch having at least one active strut assembly and an electromagnetic actuator. The clutch assembly 20 includes an outer race 22 that extends annularly about an axis A. The outer race 22 includes an outer ring segment 24 and an inner ring segment 26 that are spaced radially from one another and interconnected via a radial web segment 27. The outer ring segment 24 presents a plurality of outer lugs 28 that extend radially outwardly for mating with a first component. The first component can be a stationary component (such as a housing of a transmission) or a rotary component (such as a shaft). The outer ring segment 24 further presents a pair of protrusions 30 that extend radially outwardly. Each of the protrusions 30 defines a radially extending actuator pocket 32 and a strut pocket 33. It should be appreciated that more or fewer protrusions 30 could be utilized. The inner ring segment 26 presents a plurality of inner ramp surfaces, hereinafter referred to as inner ratchet teeth 34, that extend radially inwardly and are evenly distributed or spaced from one another about the axis A to define an inner tooth degree spacing $\theta_1$.

The clutch assembly 20 further includes an inner race 36 that also extends annularly about the axis A. The inner race 36 has an outer rim 38 and an inner rim 40 that are spaced radially from one another. The outer rim 38 is disposed radially between the outer and inner ring segments 24, 26 of the outer race 22, and the inner rim 40 is disposed radially inwardly from the inner ring segment 26 of the outer race 22. The inner rim 40 of the inner race 36 presents a plurality of inner lugs 42 that extend radially inwardly for mating with a second component (typically a rotary component). Commonly, lugs 42 interconnect a shaft or clutch plates for rotation with inner race 36. Further, the outer rim 38 of the inner race 36 presents a plurality of outer ramp surfaces, hereinafter referred to as outer ratchet teeth 44, that extend radially outwardly and are evenly distributed or spaced from one another about the axis A to define an outer tooth spacing angle $\theta_2$.

Figure 1:
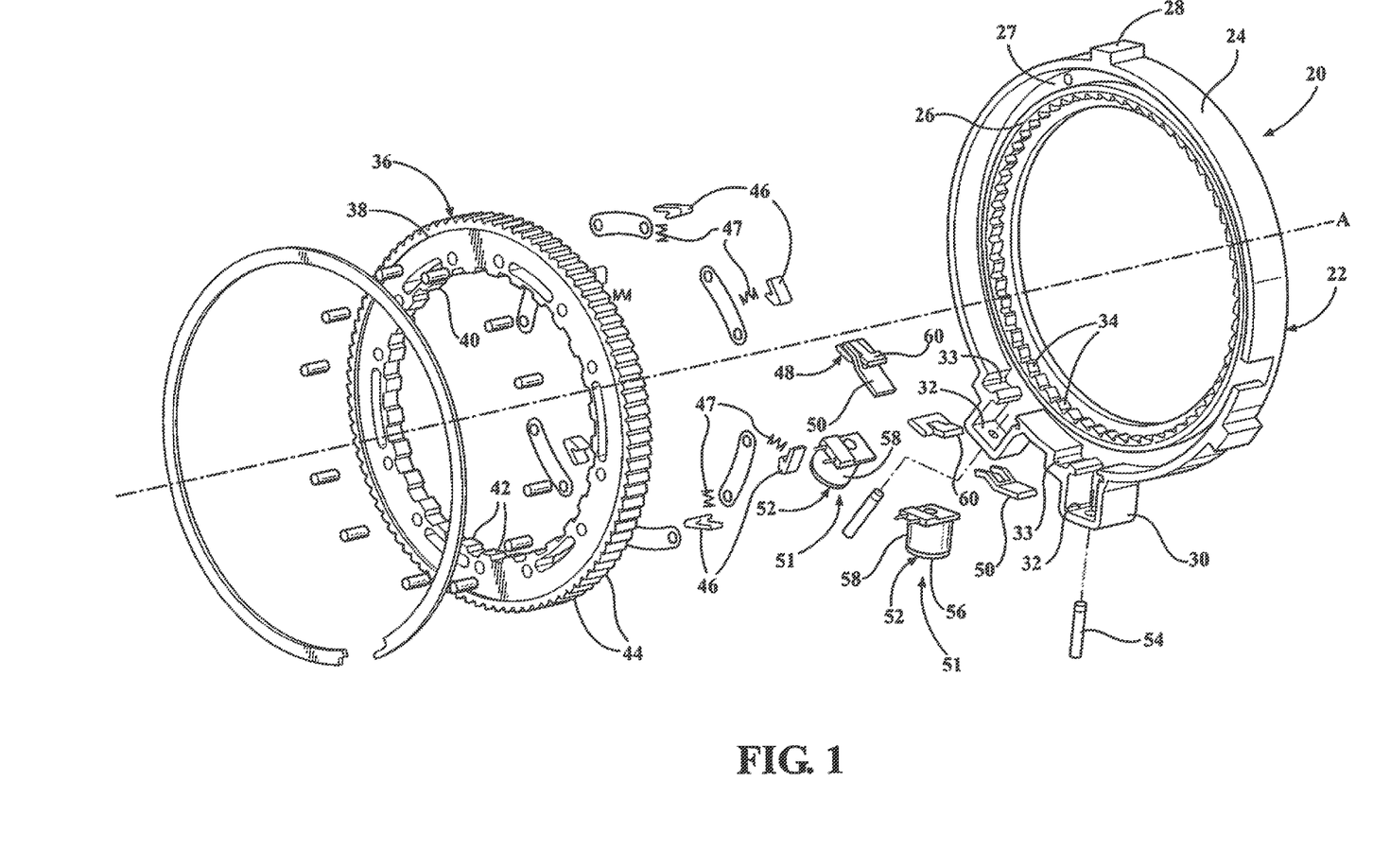
FIG. 1 is an exploded perspective view of a bi-directional clutch assembly configured to include a passive one-way clutch and a selectable one-way clutch having an electromechanical actuator.

The passive one-way forward clutch includes a plurality of locking elements or passive struts 46 that are pivotally supported in strut apertures formed in the inner race 36 for pivoting between a locking position and an unlocking position. In the locking position, as exemplarily highlighted by circles in FIGS. 2C and 2E, the passive struts 46 engage the inner ratchet teeth 34 of the outer race 22 to define a forward engagement position for connecting the outer and inner races 22, 36 to one another during counter-clockwise rotation of the inner race 36 relative to the outer race 22. Therefore, the forward engagement position established by one or more of the passive struts 46 prevents relative displacement of the outer and inner races 22, 36 in the counter-clockwise direction. However, the passive struts 46 still allow relative displacement, i.e., overrun, in the clockwise direction when located in the locking position since they ratchet over the ramped profile of the inner ratchet teeth 34 and are radially spaced from the inner ratchet teeth 34 of the outer race 22 to establish the unlocking position. As best shown in FIG. 1, the passive struts 46 are biased towards the locking position by a biasing member 47, such as a spring or the like.

As shown in FIG. 1, the selectable one-way reverse clutch includes an active strut assembly 48 received by each of the strut pockets 33 of the outer ring segment 24. Each of the active strut assemblies 48 includes an active strut 50 that is selectively pivotal between a locked and an unlocked position. In the locked position, the active strut 50 lockingly engages the outer ratchet teeth 44 of the inner race 36 during clockwise movement of the inner race 22 relative to the outer race 22 to define a reverse engagement position thereby locking the outer and inner races 22, 36 to one another. However, the active strut 50 still allows relative displacement, i.e., overrun, in the counter-clockwise direction. In the unlocked position, the active strut 50 is radially spaced from the outer ratchet teeth 44, allowing the inner and outer races 22, 36 to rotate relative to one another. Furthermore, as best illustrated in FIG. 1, each of the active strut assemblies 48 includes an armature 60 that is disposed adjacent to the active strut 50 for providing the pivotal movement of the active strut 50.

The selectable one-way reverse clutch also includes electromagnetic actuators 51, each including a coil assembly 52 mounted in the actuator pocket 32 and radially spaced from the active strut 50 and armature 60. The coil assembly 52 includes a core 54 of a magnetically permeable material, a bobbin 56 disposed about the core 54, and a coil 58 wrapped about the bobbin 56. Furthermore, the armature 60 is disposed between the active strut 50 and the coil 58 for pivoting toward the core 54 and thus providing the pivotal movement of the active strut 50 in response to energization of the coil 58.

More specifically, when voltage and/or current are applied to the coil 58, the coil 58 becomes an electromagnet producing an electric field (or flux). The flux flows outwards in all directions and transfers through the small air gap between the armature 60 and core 54 in the center of the coil assembly 52. The core 54 becomes magnetized, therefore attracting the armature 60 towards the core 54. The resulting motion forces the active strut 50 to mechanically deploy due to the linkage between the active strut 50 and the armature 60. On deployment, the active strut 50 moves from its unlocked position to its locked position where it locates itself against one of the outer ratchet teeth 44 of the inner race 36 to define the reverse engagement position, effectively locking the inner race 36 from rotating in that direction. Disengagement occurs as voltage and/or current is removed from the coil assembly 52, wherein the armature 60 is demagnetized and free from the coil assembly 52. A biasing spring (not shown) is positioned between the active strut 50 and the outer race 22, causing the active strut 50 to move back to its unlocked position during disengagement.

The combination of the passive and active struts 46, 50 provide for a bi-directional configuration of the clutch assembly 20 that allows engagement in two opposite directions (clockwise and counter-clockwise). It should be appreciated that the arrangement of the armature 60, active strut 50, and coil assembly 52 can act to apply a locking force not only in a radial direction (as shown in FIGS. 1, and 2A-2E) but also in an axial direction, depending on the layout and/or requirements of the clutch assembly 20. Radial stacked clutch assembly designs offer packaging advantages over their axial counterparts in situations where axial space is tight, e.g., in automatic transmissions. Further, radially applied clutches transmit driving torque directly outwards to be pounded against the transmission housing without the fear of forces being directed axially which could cause problems for the sizing of other system components to compensate for axial force.

To maintain functionality, it is desirable to maintain a consistent amount of backlash between the forward and reverse engagement positions of the passive and active struts 46, 50 so that the clutch assembly 20 is free to disengage in one direction before engaging in the opposite direction. Backlash is defined as travel in the opposite direction from a current forward or reverse engagement position that is required to release a first strut (i.e., passive or active strut) before the second (e.g., other) strut is in position to engage its respective teeth in the opposite direction. In other words, bi-directional backlash is the amount of rotational movement that is available between the forward engagement position and the reverse engagement position. Once again, the forward engagement position is defined by an engagement of the passive strut(s) with the inside ratchet teeth of the outer race and the reverse engagement position is defined by an engagement of the active strut(s) with the outside ratchet teeth of the inner race. If no backlash was available between the forward and reverse engagement positions, it is possible for both the passive and active struts/sprags to be engaged at the same time, thus preventing their disengagement and any relative movement between the inner and outer races whether it is intended or not. In contrast, with too much backlash, the engagement of the passive and active struts with the respective ratchet teeth in both directions may be perceived as rough and unrefined, detrimentally affecting the NVH characteristics of the transmission.

In accordance with an aspect of the subject disclosure, and with reference to FIGS. 2A-2E, clutch assembly 20' is configured to provide a constant amount of backlash between the forward and reverse engagement positions. Specifically, as will be described in more detail below, the active struts 50 of the clutch assembly 20' are circumferentially spaced from the inner struts 46 such that the active struts 50 never engage the outer ratchet teeth 44 on the inner race 36 as the passive struts 46 engage the inner ratchet teeth 34 on the outer race 22. To maintain constant backlash, engagement in one direction is optimally designed to occur midpoint between two consecutive possible engagements in the opposite direction.

Initially, as shown in FIGS. 2A-2E, the bi-directional clutch assembly 20' includes a plurality of passive struts 46 that are unevenly circumferentially spaced from one another along the inner race 36 to establish an indexed relationship among the plurality of passive struts 46. As highlighted in FIGS. 2C and 2E, this indexed relationship establishes a staggered engagement of sequential ones of the passive struts 46 with the inner ratchet teeth 34 of the outer race 22. Put another way, the indexed relationship among the passive struts 46 provides that only some of the passive struts 46 are engaged at any one time (with engaged passive struts highlighted by the circles) with sequential passive struts 46 being disposed in a ready to engage position. While all of the passive struts 46 could be engaged at the same time to increase the torque capability of the passive one-way forward clutch, such an arrangement increases the forward backlash and thus is detrimental to the function of the forward clutch as it results in an increase in NVH. The unevenly circumferentially spaced relationship of the passive struts 46 provides for greater engagement precision between the passive struts 46 and the inner ratchet teeth 44 which leads to decreased forward backlash for the passive one-way forward clutch.

Figure 2A:
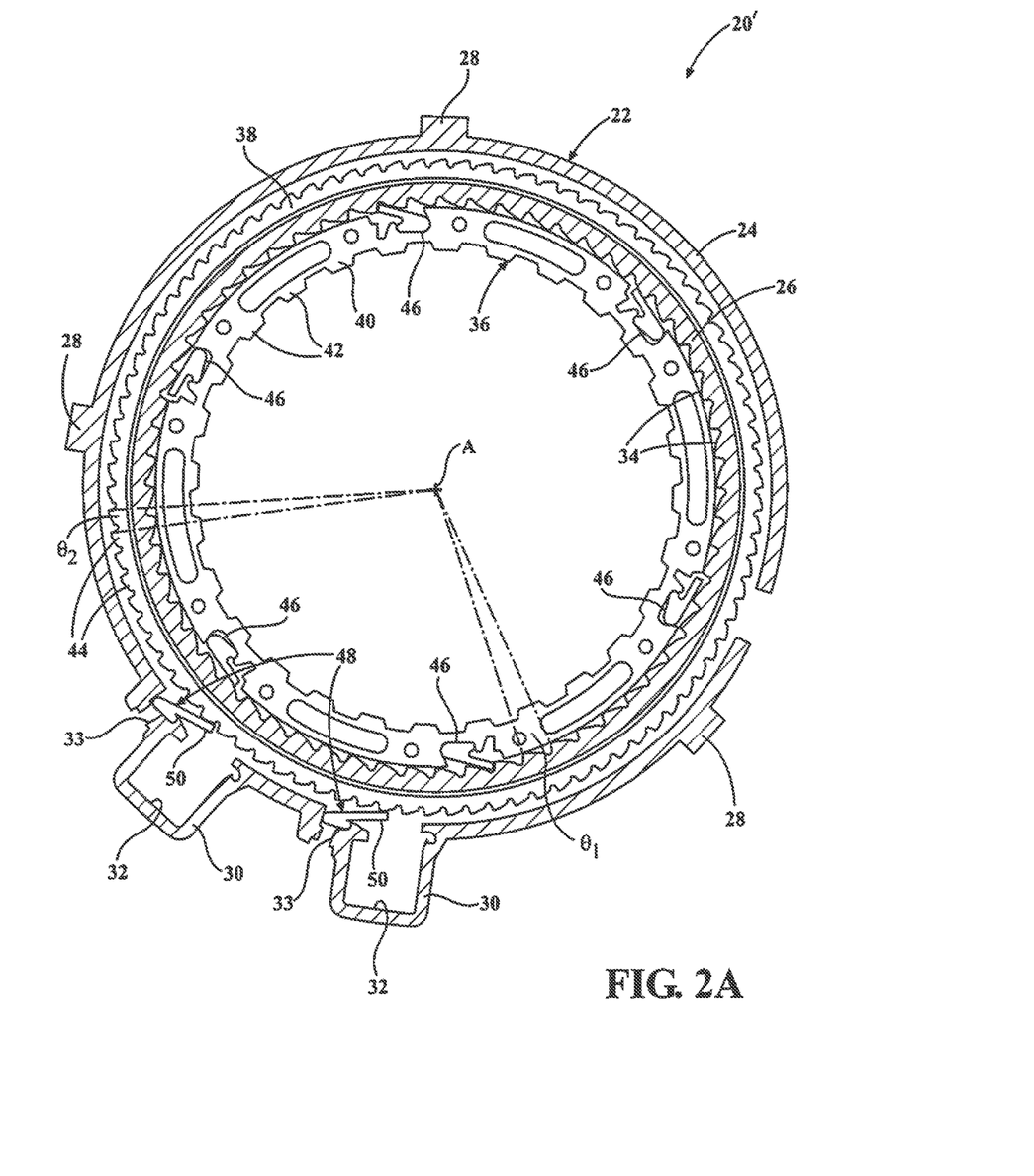
FIG. 2A is a partial sectional view of a bi-directional clutch assembly configured with a constant backlash arrangement between the struts of the passive and selectable one-way clutches in accordance with an aspect of the present disclosure.
Figure 2B:
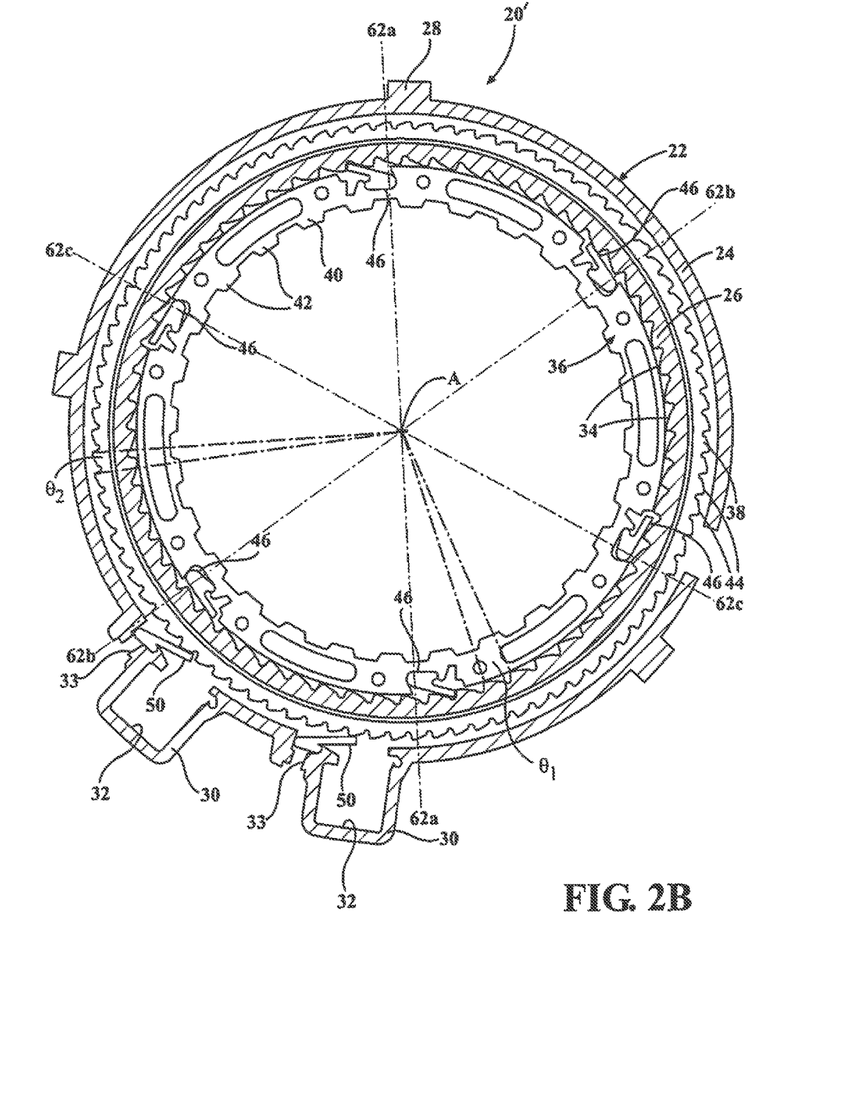
FIGS. 2B and 2C are generally similar to FIG. 2A and more clearly indicates a plurality of sets of diametrically opposed passive sets associated with one non-limiting constant backlash configuration of the present disclosure.
Figure 2C:
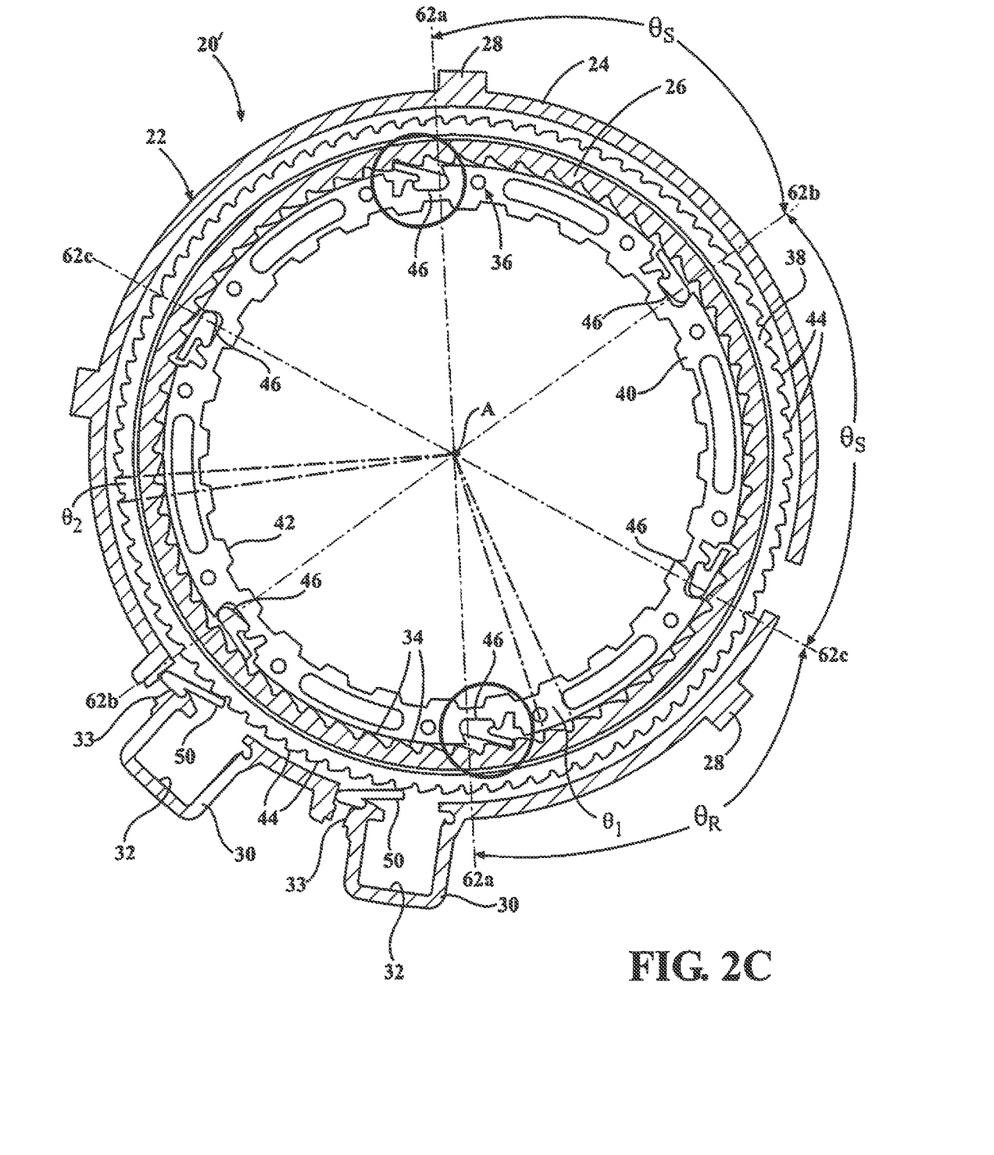
Figure 2D:
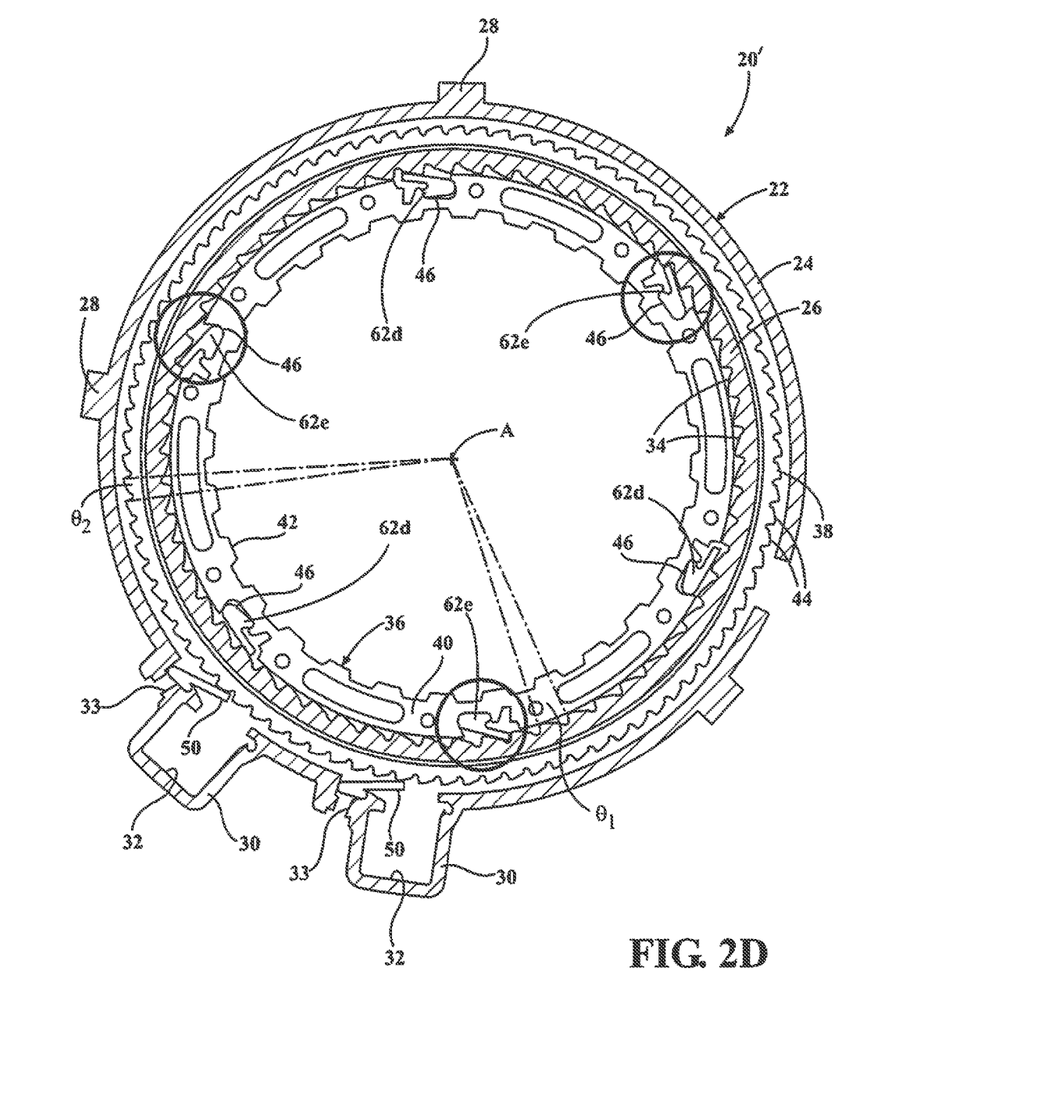
FIGS. 2D and 2E illustrate another alternative version of a bi-directional clutch assembly configured with a plurality of sets of passive set trios in another embodiment of a constant backlash arrangement of the bi-directional clutch assembly.
Figure 2E:
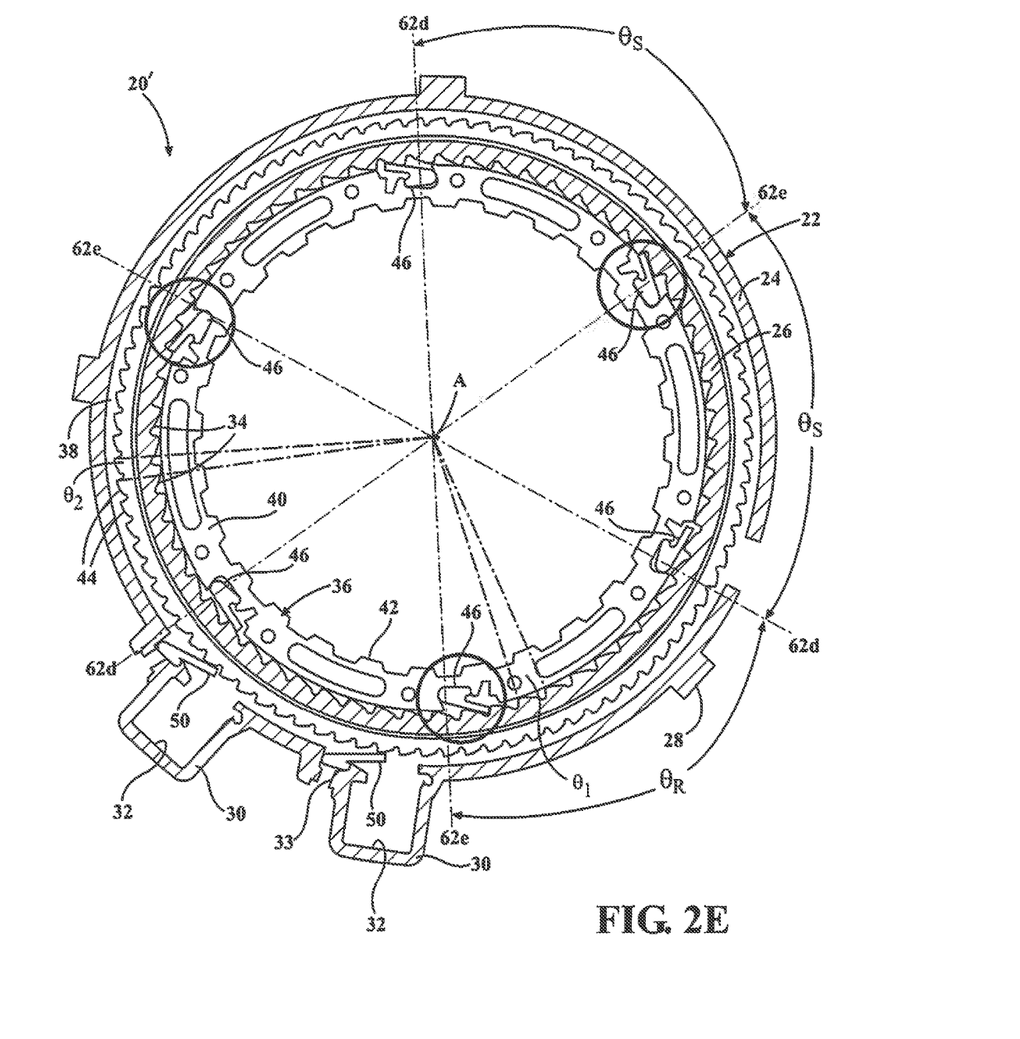

As best illustrated by FIGS. 2A-2E, in a preferred and non-limiting arrangement of the bi-directional clutch assembly 20', the passive one-way clutch includes six passive struts 46 that are pivotably supported by inner race 36. However, it should be appreciated that more or fewer passive struts 46 could alternatively be utilized. In this preferred arrangement, as best illustrated by FIGS. 2B-2E, the indexed relationship among the passive struts 46 can be accomplished by grouping the passive struts into a plurality of sets 62a, 62b, 62c, 62d, 62e of evenly circumferentially spaced passive struts 46. For example, as best illustrated by FIGS. 2B and 2C, in a non-limiting example the passive struts 46 are grouped into multiple sets of diametrically opposed passive struts 62a, 62b, 62c, with each one of the passive struts 46 in the sets 62a, 62b, 62c disposed 180 degrees from each other. Alternatively, as best illustrated by FIGS. 2D and 2E, in another non-limiting example, the passive struts 46 can be grouped into multiple sets of passive strut trios 62d, 62e, with each set 62d, 62e including a trio of passive struts disposed 120 degrees apart from one another.

Depending on the application, it is desirable to have improved engagement precision (less backlash) which can be achieved by positioning the sets 62a, 62b, 62c, 62d, 62e of passive struts in a circumferentially indexed manner. For example, in each exemplary arrangement of the sets 62a, 62b, 62c, 62d, 62e of passive struts, and as illustrated in FIGS. 2B-2E, a first set 62a, 62d of the sets of passive struts are a reference, or un-indexed, set of passive struts and then each sequential set 62b, 62c, 62d of passive struts is circumferentially indexed towards a preceding set of the passive struts by a forward indexing angle. As will be described in more detail below, the forward indexing angle is equal to the inner tooth degree spacing $\theta_1$ (i.e., number of degrees between adjacent inner ratchet teeth) divided by the number of sets of passive struts.

For example, in the non-limiting embodiment shown in FIGS. 2A-2E, the outer race 22 exemplarily includes sixty (60) inner ratchet teeth 34 with each of the inner ratchet teeth 34 spaced by six (6) degrees from one another (i.e., the inner tooth degree spacing $\theta_1$). With reference to FIGS. 2B and 2C, when the sets of passive struts 62a, 62b, 62c are comprised of a pair of diametrically opposed passive struts, the sets of diametrically opposed passive struts 62a, 62b, 62c are indexed so that only a single pair of diametrically opposed passive struts are engaged with the inner ratchet teeth 34 of the outer race 22 at any one time. In order to avoid simultaneous engagement of all sets 62a, 62b, 62c of passive struts with the inner ratchet teeth 34 of the outer race 22, a first pair of diametrically opposed passive struts 62a is considered the "reference" or un-indexed set and the sequential or second pair of diametrically opposed passive struts 62b is positioned circumferentially indexed (i.e. staggered) towards the reference first pair 62a by the forward indexing angle, in this case 2 degrees (i.e., 6 degrees of inner tooth spacing between two consecutive teeth divided by three sets of diametrically opposed passive struts=a 2 degree forward indexing angle). Similarly, the next sequential or third set 62c of diametrically opposed passive struts is circumferentially indexed towards the second set 62b by the forward indexing angle, i.e., 2 degrees. Accordingly the three sets of diametrically opposed passive struts pairs 62a, 62b, 62b can engage the inner ratchet teeth 34 during every two degrees of rotation in the first direction.

As best illustrated in FIG. 2C, the aforementioned indexing disposes each sequential set 62b, 62c of passive struts at a spacing angle $\theta_S$ relative to the preceding set of passive struts by an equidistant angle (equal to 360 degrees divided by the number of passive struts 46) minus the forward indexing angle. For example, if the six passive struts 36 were designed to collectively engage the inner ratchet teeth 34 at the same time, each of the six passive struts 36 would be equidistantly spaced from one another by an equidistant angle of 60 degrees. However, in this instance, each sequential set 62b, 62c of passive struts is indexed towards a preceding set of passive struts by the forward indexing angle of 2 degrees. Accordingly, each sequential set 62b, 62c of passive struts is disposed at a spacing angle $\theta_S$ of 58 degrees, leaving the remaining angle $\theta_R$ which extends between the last of the sequential sets 62c of diametrically opposed passive struts and the reference set 62a of diametrically opposed passive struts to be 64 degrees (i.e., 180 degrees minus 2×58 degrees).

In the other non-limiting embodiment, and with reference to FIGS. 2D and 2E, the indexed relationship between the sets of passive struts is further explained using the same number of passive struts 46 and inner ratchet teeth 34, but with the sets of passive strut trios 62d, 62e having a tri-engagement configuration. As will be explained below, such an arrangement leads to increased torque capacity over the sets of diametrically opposed passive strut pairs with slightly less engagement precision. Specifically, as described previously, the plurality of sets 62d, 62e of passive struts trios are made up of groups of three passive struts 46 each equidistantly spaced one hundred and twenty degrees (120) from one another. In this arrangement, only one trio of passive struts is engaged with the inner ratchet teeth 34 of the outer race 22 at one time. Once again, the first set 62d of passive strut trios is classified as a first or "reference" set and a second or sequential set 62e of passive strut trios group is circumferentially indexed (i.e., staggered) towards the first set 62d of passive strut trios by the forward indexing angle, in this case 3 degrees (i.e., 6 degrees of inner tooth spacing between two consecutive teeth divided by two sets of passive strut trios=a 3 degree forward indexing angle). Accordingly the two sets of passive struts trios 62d, 62e can each engage the inner ratchet teeth 34 during every three degrees of rotation in the first direction. This arrangement achieves greater torque capacity over use of the sets comprised of pairs of diametrically opposed passive struts via a triple engagement of the passive struts 46 with the inner ratchet teeth 34 of the outer race 22 while providing slightly more backlash (i.e., a 3 degree forward indexing angle vs. a 2 degree forward indexing angle).

As best illustrated in FIG. 2E, the aforementioned indexing disposes the sequential set 62e of passive strut trios at a spacing angle $\theta_S$ relative to the preceding (and in this case reference) set 62d of passive strut trios by an equidistant angle (equal to 360 degrees divided by the number of passive struts 46) minus the forward indexing angle. In this instance, the sequential set 62e of passive strut trios is indexed towards the preceding (and reference) set 62d of passive strut trios by the forward indexing angle of 3 degrees. Accordingly, the sequential set 62e of passive strut trios is disposed at a spacing angle $\theta_S$ of 57 degrees, leaving the remaining angle $\theta_R$ which extends between the sequential set 62e of passive strut trios and the reference set 62d of passive strut trios to be 63 degrees (i.e., 120 degrees minus 57 degrees).

As will be appreciated, the actual angle values described previously can change depending on the required angular backlash, the number of passive struts 46 employed, the number of inner ratchet teeth 34, and the desired type of engagement (e.g., single, dual, triple, or quadruple engagement).

As previously mentioned, the bi-directional clutch assembly 20' also includes a selectable one-way reverse clutch which includes at least one active strut 50 that is selectively pivotable from an unlocked position to a locked position. In the locked position, the active strut 50 engages one of the plurality of outer ratchet teeth 44 during rotation of the inner race 36 in a second direction opposite the first direction to define the reverse engagement position. As best illustrated in FIGS. 2A-2E, in a non-limiting embodiment the bi-directional clutch assembly 20' includes a plurality of active struts 50, preferably two active struts 50, which are collectively pivotable from the unlocked position to the locked position. However, additional active struts 50 can be utilized without departing from the scope of the subject disclosure. Similar to the plurality of passive struts 46, the plurality of active struts 50 are also circumferentially indexed relative to one another to reduce and optimize the reverse backlash for the bi-directional clutch assembly 20'. Accordingly, while the bi-directional clutch assembly 20 of FIGS. 2A-2E includes two electrically-actuated active struts, only one active strut is engaged with a respective one of the ratchet teeth at any one time (i.e., single engagement) with the other active strut 50 being disposed in a ready to engage position.

Similar to the indexing of the passive struts 46, a first one of the plurality of active struts 50 is a reference, or non-indexed, active strut 50 and each sequential active strut 50' is circumferentially indexed towards the preceding active strut 50 by a reverse indexing angle. As will be described in the following exemplary arrangements, the reverse indexing angle is equal to the outer tooth degree spacing $\theta_2$ (i.e., number of degrees between adjacent outer ratchet teeth 44) divided by the number of active struts 50. For example, as illustrated in FIGS. 2A-2E, in the non-limiting example of the bi-directional clutch assembly 20', the inner race 22 includes ninety (90) outside ratchet teeth 44 for being engaged by the active struts 50 of the outer race 22. Accordingly, each of the outside ratchet teeth 44 is spaced by four degrees from one another (i.e., the outer tooth degree spacing $\theta_2$) Further, since there are two electrically-actuated active struts 50, the sequential active strut 50' is indexed towards the reverse indexing angle, in this case two degrees (i.e., the outer tooth degree spacing $\theta_2$ of four degrees divided by two active struts). Accordingly, engagement between the active struts 50 and outside ratchet teeth 44 can occur during every two degrees of rotation of the inner race 36. In other words, the active struts 50 do not engage the inner race 36 simultaneously but rather only when one active strut 50 is disposed in the reverse engagement position with the other active strut preferably spaced halfway between two consecutive outer ratchet teeth 44.

In a preferred arrangement, this reverse indexing angle (e.g., reverse clutch backlash) is equal to, or a multiple of, the forward indexing angle (e.g., forward clutch backlash) to prevent lock-up or binding of the forward and reverse transmission clutches during operation. As an example, if the forward indexing angle (e.g., forward clutch backlash) is 2 degrees, the reverse indexing angle (e.g., reverse clutch backlash) can be 2, 4, 8 degrees and so on. Likewise, if the forward indexing angle (e.g., forward clutch backlash) is 1.5 degrees, the reverse indexing angle (e.g., reverse clutch backlash) can be 1.5, 3.0, 4.5, 6.0 degrees and so on. This relationship between the forward and reverse indexing angles can be applied in both directions such that the forward clutch backlash can be equal to, or a multiple of, the reverse clutch backlash. For example, if the reverse indexing angle (e.g., reverse clutch backlash) is 2 degrees, the forward indexing angle (e.g., forward clutch backlash) can be 2, 4, 8 degrees and so on. As a non-limiting example, with reference to the arrangement of the bi-directional clutch assembly 20' including a plurality of sets of diametrically opposed passive struts 62a, 62b, 62c, the forward indexing angle is equal to 2 degrees and the reverse indexing angle of the active struts 50 is also 2 degrees.

As previously described, when the passive struts 46 engage the inner ratchet teeth 34 of the outer race 22, this defines a forward engagement position for connecting the outer and inner races 22, 36 to one another during counter-clockwise rotation of the inner race 36 relative to the outer race 22. This forward engagement position established by one or more of the passive struts 46 prevents relative displacement of the outer and inner races 22, 36 in the counter-clockwise direction. To maintain constant functionality for the bi-directional clutch assembly 20', it is desirable to maintain a consistent amount of backlash between the forward and reverse engagement positions (i.e., forward-to-reverse backlash) of the passive and active struts 46, 50 so that the clutch assembly 20' is free to disengage in one direction before engaging in the opposite direction. In other words, forward-to-reverse backlash is the amount of rotational movement that is available between the forward engagement position and the reverse engagement position. Backlash less than 0.5 degrees can bind the clutch due to elastic deformation caused during loading. In contrast, backlash exceeding 1.5 degrees has a negative influence on NVH. In a preferred arrangement of the bi-directional clutch assembly 20', the forward-to-reverse backlash is between 0.75 and 1.25 degrees, and preferably approximately 1.0 degree. This arrangement permits a constant amount of predetermined forward-to-reverse backlash to be introduced into the clutch assembly. Providing for such evenly distributed backlash improves bi-directional clutch functionality when switching between the engagement of the passive and active struts 46, 50 and thus ensures consistent disengagement when required.

The basic theory for the integration of a mechanism providing backlash control is that engagement in one direction should be designed to occur between two possible engagements in the opposite direction. With reference to the above disclosed alternative embodiments, the number of struts, inner and outer ratchet teeth and type of engagement (single, double, triple or quad) provides a desired combination of torque capacity and backlash.

It should be appreciated that the foregoing description of the embodiments has been provided for purposes of illustration and the aforementioned teachings for providing backlash could be utilized on other bi-directional clutch assembly configurations. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A bi-directional clutch assembly comprising:
an outer race presenting a plurality of inner ratchet teeth;
an inner race presenting a plurality of outer ratchet teeth;
a passive one-way forward clutch including a plurality of passive struts pivotably supported by said inner race for pivoting into engaging relationships with said inner ratchet teeth during rotation of said inner race in a first direction;
a selectable one-way reverse clutch including at least one active strut supported by said outer race and selectively pivotable from an unlocked position wherein said active strut is disengaged from said outer ratchet teeth to a locked position for engaging one of said plurality of outer ratchet teeth during rotation of said inner race in a second direction opposite said first direction;
said plurality of passive struts being unevenly circumferentially spaced from one another along said inner race for staggering engagement by sequential ones of said plurality of passive struts with said inner ratchet teeth; and
said plurality of passive struts grouped into a plurality of sets of evenly circumferentially spaced passive struts with a first set of passive struts being a reference set of passive struts and each sequential set of passive struts being circumferentially indexed towards a preceding set of passive struts by a forward indexing angle to establish an indexed relationship among said plurality of passive struts.

2. A bi-directional clutch assembly as set forth in claim 1 wherein each sequential set of passive struts is disposed at a spacing angle relative to the preceding set of passive struts by an equidistant angle minus the forward indexing angle, wherein the equidistant angle is defined by 360 degrees divided by the number of passive struts.

3. A bi-directional clutch assembly as set forth in claim 1, wherein said plurality of inner ratchet teeth are evenly spaced from one another to define an inner tooth degree spacing and said forward indexing angle is equal to the inner tooth degree spacing divided by the number of sets of passive struts.

4. A bi-directional clutch assembly as set forth in claim 3 wherein each of said sets of passive struts includes a diametrically opposed pair of passive struts.

5. A bi-directional clutch assembly as set forth in claim 4 wherein said plurality of sets of diametrically opposed passive struts includes three sets of diametrically opposed passive struts.

6. A bi-directional clutch assembly as set forth in claim 5 wherein said plurality of inner ratchet teeth include sixty inner ratchet teeth to define an inner tooth degree spacing of six degrees and a forward indexing angle of two degrees.

7. A bi-directional clutch assembly as set forth in claim 3 wherein each of said sets of said struts includes a trio of passive struts disposed 120 degrees apart from one another.

8. A bi-directional clutch assembly as set forth in claim 7 wherein said plurality of sets of passive strut trios includes two sets of passive strut trios.

9. A bi-directional clutch assembly as set forth in claim 8 wherein said plurality of inner ratchet teeth include sixty inner ratchet teeth to define an inner tooth degree spacing of six degrees and a forward indexing angle of three degrees.

10. A bi-directional clutch assembly as set forth in claim 1, wherein said reverse clutch includes a plurality of active struts collectively pivotable from the unlocked position to the locked position and a first one of said active struts being a reference active strut and each sequential active strut being circumferentially indexed towards a preceding active strut by a reverse indexing angle.

11. A bi-directional clutch assembly as set forth in claim 10 wherein said plurality of outer ratchet teeth are evenly spaced from one another to define an outer tooth degree spacing and said reverse indexing angle is equal to said outer tooth degree spacing divided by the number of active struts.

12. A bi-directional clutch assembly as set forth in claim 11 wherein said plurality of active struts includes two active struts and said plurality of outer ratchet teeth include ninety ratchet teeth to define an outer tooth degree spacing of four degrees and a reverse indexing angle of two degrees.

13. A bi-directional clutch assembly as set forth in claim 11 wherein said reverse indexing angle is equal to or a multiple of said forward indexing angle.

14. A bi-directional clutch assembly as set forth in claim 11 wherein said forward indexing angle is a multiple of said reverse indexing angle.

15. A bi-directional clutch assembly as set forth in claim 1 further comprising:

wherein the engaging relationship between one of said plurality of passive struts and a respective one of said plurality of inner ratchet teeth during rotation of said inner race in the first direction defines a forward engagement position, wherein an engaging relationship between said at least one active strut in said locked position and a respective one of said plurality of outer ratchet teeth during rotation of said inner race in the second direction defines a reverse engagement position, and wherein an angle of rotation of said inner race between said forward and reverse engagement positions is between 0.75 and 1.25 degrees.

16. A bi-directional clutch assembly as set forth in claim 15, wherein said angle of rotation of said inner race between said forward and reverse positions is approximately 1.0 degrees.

17. A bi-directional clutch assembly as set forth in claim 1, wherein said selectable one-way reverse clutch includes at least one electromagnetic actuator for selectively pivoting said at least one active strut between said unlocked and locked positions.

* * * * *